US010748184B1

(12) United States Patent
Harrison et al.

(10) Patent No.: US 10,748,184 B1
(45) Date of Patent: Aug. 18, 2020

(54) NOTIFYING USERS OF COVERAGE

(71) Applicant: Allstate Insurance Company, Northbrook, IL (US)

(72) Inventors: K Pearl Harrison, Jacksonville, FL (US); David Dickson, Jacksonville, FL (US)

(73) Assignee: Allstate Insurance Company, Northbrook, IL (US)

( * ) Notice: Subject to any disclaimer, the term of this patent is extended or adjusted under 35 U.S.C. 154(b) by 282 days.

(21) Appl. No.: 14/301,729

(22) Filed: Jun. 11, 2014

(51) Int. Cl.
*G06Q 30/02* (2012.01)
(52) U.S. Cl.
CPC .................. *G06Q 30/0255* (2013.01)
(58) Field of Classification Search
CPC ............. G06Q 40/08; G06Q 30/0255
USPC .............................................. 705/4
See application file for complete search history.

(56) References Cited

U.S. PATENT DOCUMENTS

| | | | | |
|---|---|---|---|---|
| 8,521,566 B2 * | 8/2013 | Chatter | ................. | G06Q 40/04 705/4 |
| 8,620,693 B1 * | 12/2013 | Schumann, Jr. | ....... | G06Q 40/08 705/4 |
| 2009/0276243 A1 * | 11/2009 | Fotsch | ................... | G06Q 10/10 705/2 |
| 2013/0290036 A1 * | 10/2013 | Strange | .................. | G06Q 40/08 705/4 |
| 2014/0082519 A1 * | 3/2014 | Wang | ................ | H04M 1/72522 715/748 |
| 2014/0195274 A1 * | 7/2014 | Annappindi | ......... | G06Q 40/025 705/4 |
| 2015/0095130 A1 * | 4/2015 | Benjamin | .......... | G06Q 30/0226 705/14.27 |

\* cited by examiner

*Primary Examiner* — Robert R Niquette
*Assistant Examiner* — Liz P Nguyen
(74) *Attorney, Agent, or Firm* — Banner & Witcoff, Ltd.

(57) ABSTRACT

Systems, methods, apparatuses and computer-readable media for receiving data associated with a plurality of users, such as a group of employees receiving benefits from an employer. The plurality of users may have a primary insurance provider. Insurance information associated with one or more covered services or claims submitted may be received from the primary insurance provider and matched to the plurality of users to identify a portion (or any) of the users who have submitted a claim or received covered services. In some arrangements, a determination may be made as to whether the identified users have supplemental coverage. If so, a notification may be transmitted to the user indicating eligibility for coverage.

20 Claims, 6 Drawing Sheets

520

LOGO

ADDRESS 1
CITY, STATE, ZIP CODE

DEAR NAME,

ARE YOU AWARE THAT THE SERVICES YOU RECENTLY RECEIVED, OR A PORTION OF THOSE SERVICES, MAY BE COVERED BY SECONDARY INSURANCE YOU HAVE ALREADY OBTAINED? IF YOU WOULD LIKE MORE INFORMATION ABOUT SUBMITTING A CLAIM FOR A RECENT SERVICE, OR FOR GENERAL INFROMATION ABOUT YOUR SECONDARY INSURANCE, COVERAGE, ETC. PLEASE CALL 1-800-XXX-XXXX OR GO TO WWW.ZZZZZZZ.COM.

WE LOOK FORWARD TO ASSISTING YOU.

SINCERELY,
NAME

FIG. 5B

NOTIFYING USERS OF COVERAGE

TECHNICAL FIELD

Aspects of the disclosure generally relate to providing notifications of insurance coverage to users. In particular, various aspects described herein relate to receiving a listing of users and associated medical insurance information, such as medical billing codes, determining whether the users have secondary medical insurance that would cover the medical services associated with or related to the received billing codes and notifying users of the coverage.

BACKGROUND

People often receive one or more non-financial benefits through an employer. For instance, many people receive (or purchase) various types of insurance through their employer. For example, an employee may receive medical insurance and/or life insurance through their employer. In some examples, the employer and employee may share the cost of the insurance, while in other examples the employer or employee may bear the cost of the insurance.

Although an employee may receive medical and/or life insurance, the employee may desire to have additional coverage and, in some cases, may elect to obtain supplemental or secondary insurance. This supplemental or secondary insurance may, in some arrangements, be offered to the employee by the employer (e.g., as an additional benefit). The employee and/or employer may share the cost or one party may bear the cost of the supplemental or secondary insurance.

However, while employees may obtain supplemental or secondary insurance, many employees do not take advantage of the benefits of supplemental or secondary insurance. For instance, employees who receive a medical service may submit a claim to the primary insurance provider and might not submit any claim to the supplemental or secondary insurance provider. These employees may be losing out on valuable benefits. Accordingly, it may be desirable to find ways to raise awareness about these benefits.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, apparatuses and computer-readable media for receiving data associated with a plurality of users, such as a group of employees receiving benefits from an employer. The plurality of users may have a primary insurance provider. Insurance information associated with one or more covered services or claims submitted may be received and matched to the plurality of users to identify a portion (or any) of the users who have submitted a claim or received covered services. In some arrangements, a determination may be made as to whether the identified users have supplemental coverage. If so, a determination may be made as to whether the supplemental coverage may be used to cover a portion of the services for which claims were submitted. If so, a notification may be transmitted to the user indicating eligibility for coverage.

These and other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 5A and 5B are example notifications that may be transmitted to a user regarding eligibility for supplemental insurance coverage according to one or more aspects described herein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
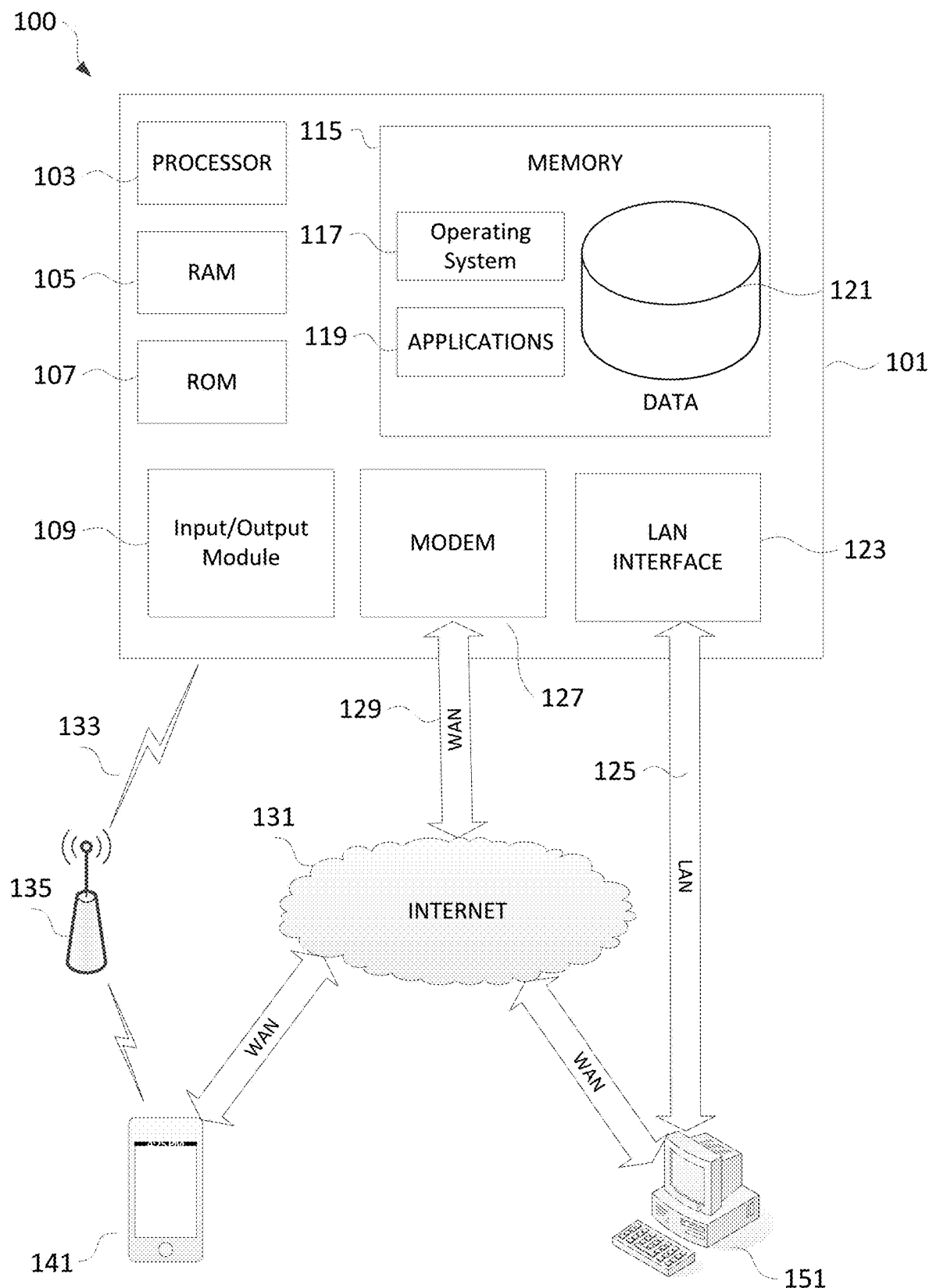
FIG. 1 illustrates a network environment and computing systems that may be used to implement aspects of the disclosure.

FIG. 1 illustrates a block diagram of a computing device (or system) 101 in communication system 100 that may be used according to one or more illustrative arrangements of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as various servers or systems, such as an insurance claim coverage system, configured as described herein for receiving data associated with one or more users having primary and secondary insurance, determining whether the secondary insurance provides coverage for a service for which a claim was submitted to the primary insurance, and notifying the user of the potential eligibility for coverage.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the system 101 to execute a series of computer-readable instructions to receive data associated with a plurality of users, receive insurance claim information associated with the plurality of users, determine whether the plurality of users are eligible for coverage under a secondary insurance and provide a notification to the users of the eligibility.

The system 101 may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the insurance claim coverage system 101. The network connections depicted in FIG. 1 include a local area network (LAN) 125 and a wide area network (WAN) 129, and a wireless telecommunications network 133, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, portable computing devices, and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, WiMAX, and wireless mesh networks, is presumed, and the various computing devices and system components described herein may be configured to communicate using any of these network protocols or technologies.

Additionally, one or more application programs 119 used by the insurance claim coverage system 101 may include computer-executable instructions (e.g., insurance data analysis, etc.) for receiving data claims submitted to a primary insurance provider, analyzing the data to whether the services for which the claims were submitted, or a portion thereof, may be covered by a secondary insurance and/or providing a notification to the user of the potential eligibility for coverage.

The systems described herein may be used by an insurance company to identify users who may be eligible for coverage but might not be submitting claims or taking advantage of the coverage. Although many examples herein will be described as being used in conjunction with an insurance company, the systems and methods described herein may be used by or with other entities or types of entities without departing from the invention. For instance, the system may be implemented by an employer with access to the insurance information of various employees to notify employees of opportunities to use secondary insurance.

Figure 2:
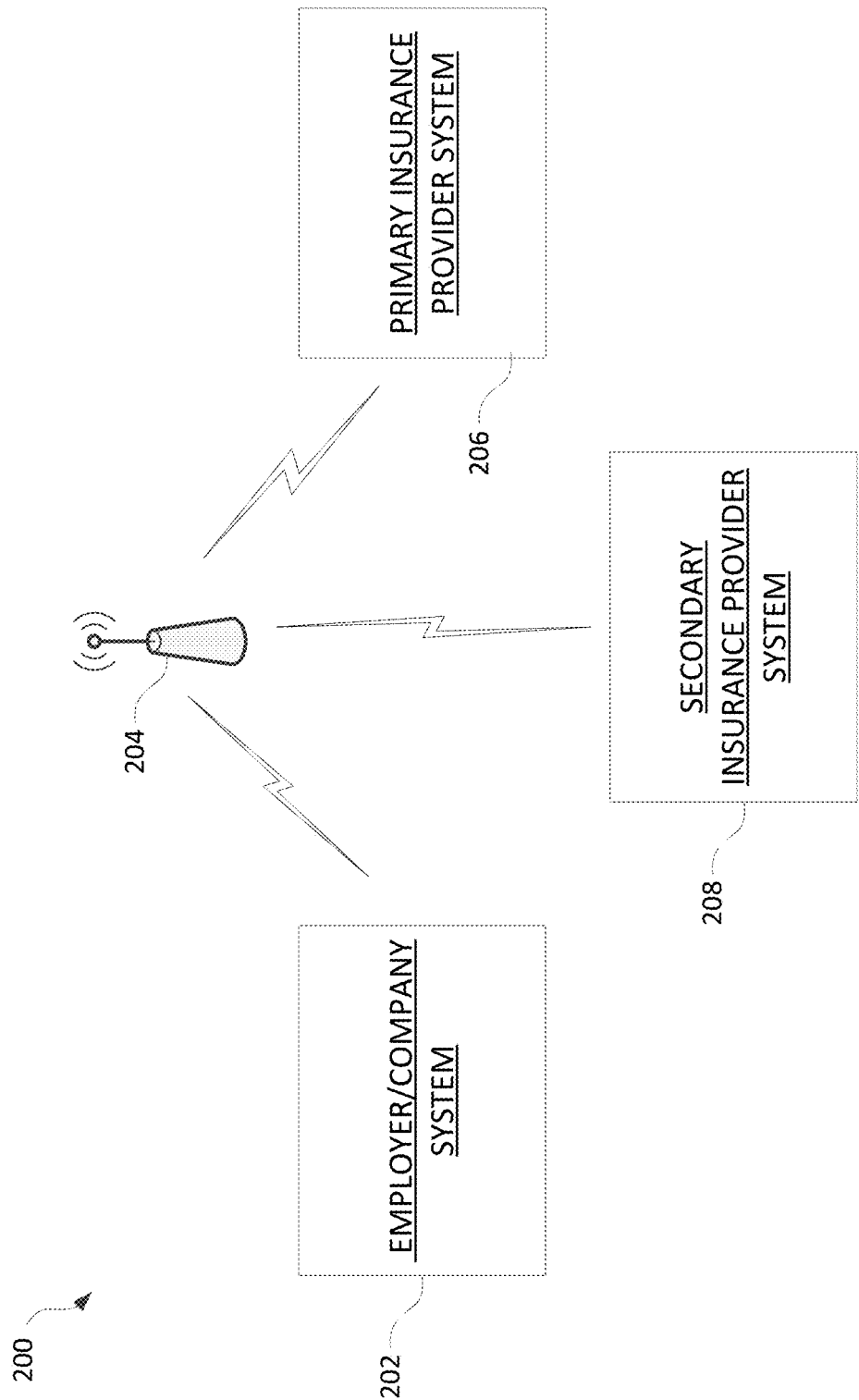
FIG. 2 is a schematic diagram of an example insurance coverage arrangement according to one or more aspects described herein.

Various aspects described herein include transferring information between systems associated with one or more entities. For instance, FIG. 2 is a schematic illustration of one example insurance coverage arrangement according to one or more aspects described herein. The arrangement 200 may include an establishment 202, such as a employer or business establishment having a plurality of users associated with it. For instance, the establishment 202 may be a corporation, university, government agency, or the like, having a plurality of users (e.g., employees) associated therewith. The users may receive benefits from the entity, such as insurance (e.g., medical insurance, life insurance, etc.). In some examples, the users may receive a primary insurance via the establishment, as well as a secondary insurance that may be used to provide coverage for items not covered by the primary insurance provider or policy. For instance, the secondary insurance may be used to cover items such as co-pays or other out-of-pocket fees, services generally not covered by the primary insurance, and the like.

In some arrangements, information associated with the users may be transmitted between the establishment 202 and a primary insurance provider system 206. The information may be transmitted via wired or wireless transmission and, in some examples, may be transmitted to a base unit 204 prior to transmission to the entity 202 or the primary insurance provider system 206. The arrangement 200 may further include a secondary insurance provider system 208. This system 208 may be connected to or in wired or wireless communication with one or more of the establishment 202 and/or the primary insurance provider system 206. Secondary insurance provider system 208 may include information associated with users having coverage provided by the secondary or supplemental insurance provider. Some or all of these users may be associated with the entity (e.g., employees of the entity). In some arrangements, the secondary or supplemental insurance may be provided by or through the entity.

In some arrangements, the primary insurance provider system 206 may transmit information to the secondary insurance provider system 208 (either directly or via a base unit, via the establishment system 202, etc.). This information may include data associated with one or more claims submitted by the users to the primary insurance provider. Various aspects of this data and the transmission of the data will be discussed more fully below.

Figure 3:
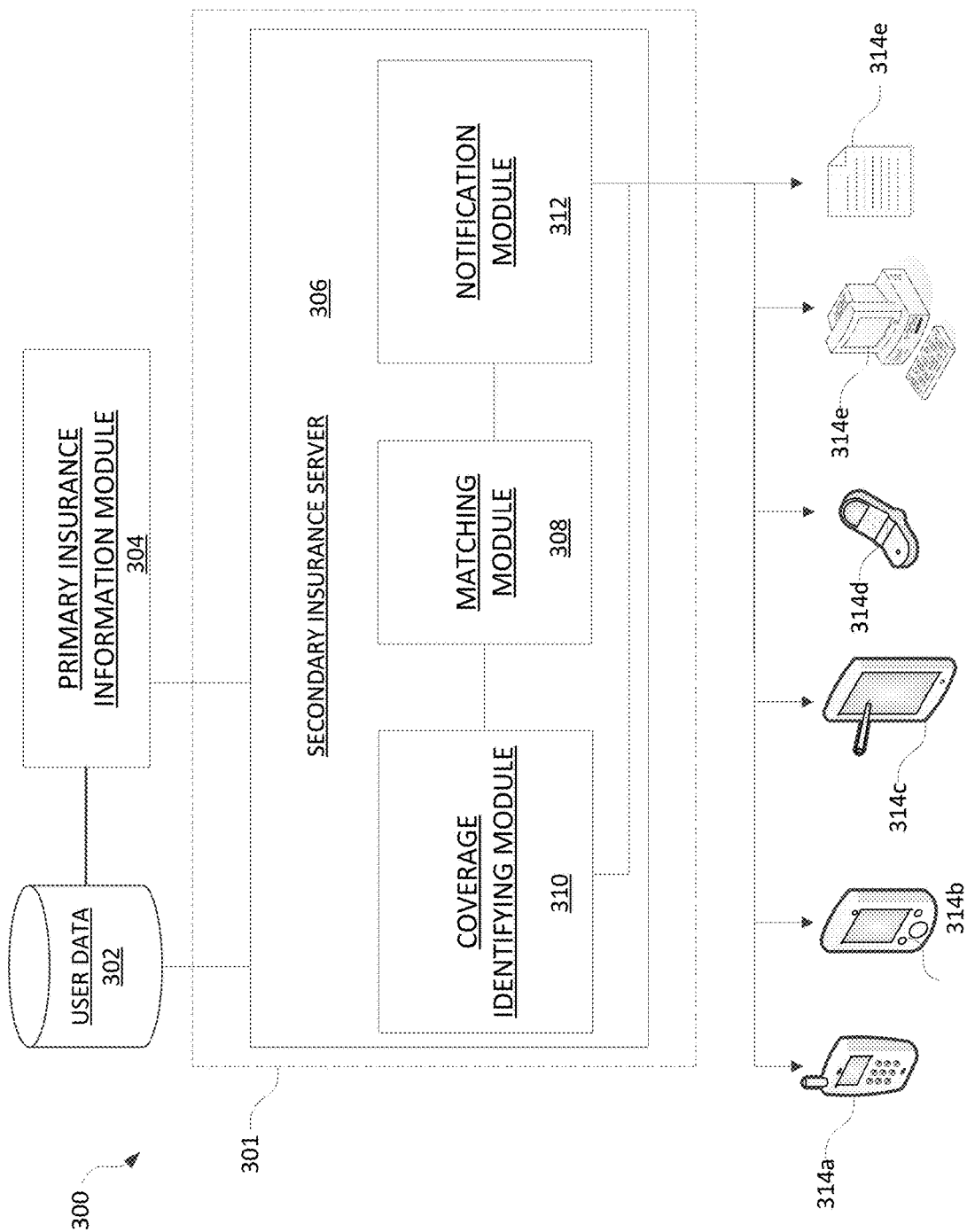
FIG. 3 is an example insurance coverage system according to one or more aspects described herein.

FIG. 3 illustrates one example insurance coverage system 300. The insurance coverage system 300 is shown associated with an entity 301. The entity may be an insurance provider, such as a secondary insurance provider, or may be one of various other types of entities without departing from the invention. As shown, aspects of the system 300 are connected to or in communication with one or more other devices, systems, and the like that are not associated with the entity 301 (e.g., user data 302, primary insurance module 304). Data may be transmitted between these devices, modules, etc. of system 300 in order to identify users having secondary insurance coverage and provide a notification to the users of the coverage, as will be discussed more fully below.

The insurance coverage system 300 includes one or more modules that include hardware and/or software and are configured to perform various functions within the system 300. For instance, the insurance coverage system 300 may include a secondary insurance server 306. The secondary insurance server 306 may be connected to or in communication with various other systems, devices, etc. associated with the system 300. For instance, the secondary insurance server 306 may be connected to or in communication with a database storing user information, such as user database 302. The user database 302 may store user information for users associated with an establishment, such as a business establishment. For instance, the user database 302 may include information associated with employees of the establishment. In some examples, user database 302 may include information such as a user's name or other unique identifier (e.g., Social Security Number), address, employment status, and the like. The user database 302 may also store information associated with one or more insurance coverages associated with the user. For instance, if the establishment offers one or more types of insurance coverage, for example, as part of an employee's benefits package, the insurance associated with each user, level of coverage, etc. may also be stored in user database 302. That is, a user may have primary and supplemental or secondary insurance. Information associated with these insurance policies may be stored in user database 302.

Although various examples discussed herein describe use of the system for a plurality of employees of a business establishment, the systems, methods, etc. described herein may be used by a variety of entities. That is, the systems and methods may be implemented to identify any group of users who have coverage that they are not fully utilizing and notify the users of that coverage.

Secondary insurance server 306 may also be connected to or in communication with primary insurance information module 304. Primary insurance information module 304 may include information associated with users who have entered or submitted a claim to their primary insurance provider. For instance, if a user (such as a user stored in user database 302) visits a doctor, the user may submit a claim to his or her primary medical insurance provider in order to have the cost of the doctor visit, or a portion thereof, covered or paid for by the primary medical insurance provider. Users who have submitted a claim to a primary insurance provider may have claim information stored in the primary insurance provider module 304. Further, one or more codes, such as billing codes, may be included with the information stored for each user and may indicate a type or level of service received by the user. The billing codes may be used to provide a universal identification of different services, types of services, etc. Further, use of the billing codes may aid in identifying related services and thus may be used to identify additional services that may be covered by, for instance, a supplemental or secondary insurance.

As discussed above, some users may have additional, supplemental insurance coverage to aid in covering the costs of any procedures, services, etc. not covered by a primary insurance policy. For instance, medical services often include a co-payment made by the user. These co-payments represent a portion of a cost of the services not covered by the primary medical insurance of the user. However, those co-payments, and or various other fees, costs, etc., may be covered by a supplemental insurance policy that may be provided by a secondary insurance provider. The secondary insurance provider may be the same as or different from the primary insurance provider.

Often, users do not take full advantage of the coverage available to them under the supplemental insurance policy. For instance, users often fail to submit claims to a secondary insurance provider to cover costs not covered by the primary insurance. Accordingly, users are not gaining the full benefit of the secondary insurance available to them. In order to increase use of the secondary insurance available to users, the secondary insurance provider may identify users who are eligible for coverage but are not submitting claims to the supplemental or secondary insurance provider. In some arrangements, the secondary insurance provider may notify the identified users in order to encourage them to submit claims and fully utilize the insurance coverage available to them.

For instance, the secondary insurance server 306 may receive information associated with a plurality of users (e.g., from user database 302) as well as information associated with medical services, or claims associated therewith, received by one or more of the plurality of users (e.g., from primary insurance information module 304). The secondary insurance server 306 may then process the received information in order to identify users who are eligible for coverage under a secondary insurance plan or policy but who have not submitted a claim. The secondary insurance server 306 may further generate a notification to users indicating eligibility for coverage under a supplemental or secondary insurance policy or plan.

In some arrangements, the secondary insurance server 306 may attempt to match user information from the user database 302 with claim information received from the primary insurance module 304. For instance, a matching module 308 may attempt to match the user information with the claim information. Matches made between the user information and the claim information may identify users (e.g., employees) of the establishment who have submitted a claim to the primary insurance provider.

In some arrangements, user information might not be matched with the received data from the primary insurance module 304. Instead, data associated with users who have submitted claims may be received from the primary insurance module 304 by the secondary insurance server 306 and may be processed to identify users who have submitted claims who are eligible for supplemental coverage, as will be discussed more fully below. That is, in some examples, user data might not be received by the secondary insurance server 306 and, instead, all user information and claim information may be received from primary insurance module 304, thereby reducing or eliminating the need for the matching aspect discussed above.

The coverage identifying module 310 of the secondary insurance server 306 may then evaluate the identified users to determine whether they have supplemental or secondary insurance coverage. In some examples, the supplemental or secondary coverage may be an option in which some or all of the employees of an establishment may enroll. Accordingly, the system 300 may identify employees who have submitted claims who also have supplemental or secondary coverage.

The coverage identifying module 310 may also determine, based on information received from, e.g., the primary insurance module 304, whether any portion of the costs of services may be covered by the supplemental or secondary insurance. For instance, based on the types of services associated with the submitted claims, the coverage identifying module 310 may determine whether any portion of those services may be covered by the supplemental or secondary insurance. For example, if the primary insurance module 304 provides a plurality of medical billing codes associated with services received by users and submitted as claims for coverage under the primary medical insurance, the billing codes may be transmitted to the secondary insurance server 306 and the coverage identifying module 310 may determine whether the services and/or costs of the services, or any portion thereof, may be covered by a supplemental or secondary medical insurance policy, based, for example, on the received billing codes identifying the services.

In some examples, the coverage identifying module 310 may further determine whether any related services may be covered by the supplemental or secondary insurance. For instance, if a user recently had treatment for back pain, the primary insurance might indicate that as a service received and the coverage identifying module 310 may determine whether any portion of that service was covered, as well as whether a related service, such as a chiropractic visit, might be covered by the supplemental insurance.

Users determined as having received services for which supplemental insurance may cover a portion of the costs may then be identified and notified of this potential coverage. For example, notification module 312 may generate a notification to be transmitted to the identified users. The notification may be, in some examples, a document (e.g., paper document, electronic document, etc.) indicating that the user may be eligible for coverage and providing contact or other information for the user to pursue the potential coverage. The notification may be transmitted from the notification module 312 via electronic means to one or more computing devices, such as computing devices 314a-314e. For instance, the notification may be transmitted via email, SMS, and the like, to a user's smart phone 314a, personal digital assistant (PDA) 314b, tablet computing device 314c, cell phone 314d or other computing device 314e. Additionally or alternatively, a hard copy or paper notification 316 may be generated and transmitted to the user. The paper notification may be generated by, e.g., printing an electronic version of the notification, etc., and may be transmitted to the user via traditional mail, courier service, and the like.

Further descriptions and examples of the functions and analyses that may be executed using systems 200 and 300 and associated components are described below in reference to the remaining figures.

Figure 4:
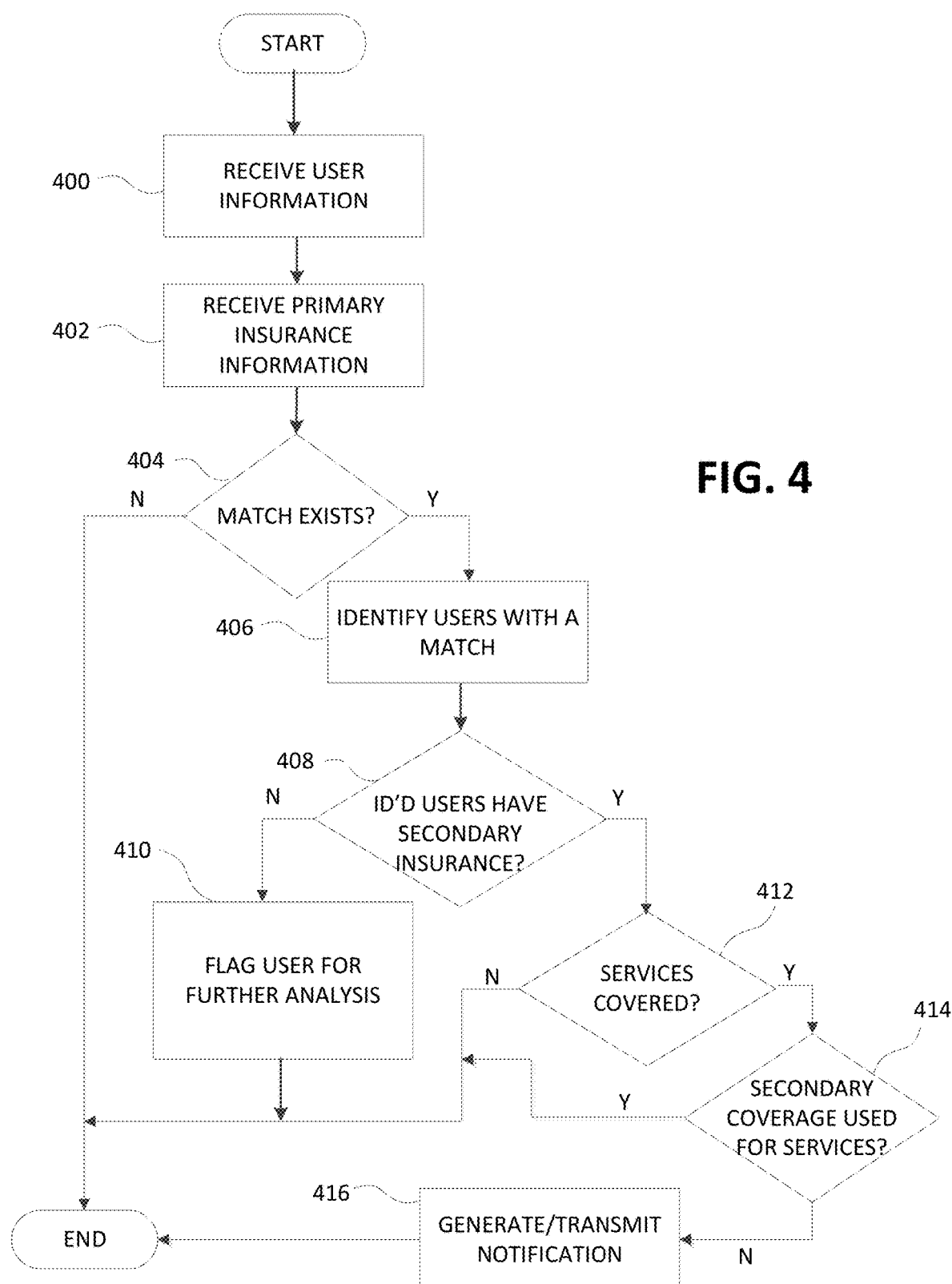
FIG. 4 is a flow chart illustrating one example method of determining whether a user is eligible for supplemental insurance coverage and notifying the user of eligibility according to one or more aspects described herein.

FIG. 4 illustrates one example method of determining whether a user is eligible for supplemental coverage and notifying the user of the coverage according to one or more aspects described herein. In step 400, user information may be received. The user information may be received at a system (such as system 300) associated with an entity. In some examples, the entity may be a provider of supplemental or secondary insurance. In other examples, the entity may be a provider of primary insurance or both primary and secondary insurance.

The received user information may include information associated with a plurality of users associated with an establishment. For instance, the plurality of users may be employees of a business establishment. The information associated with the users may include names or other unique identifiers of the users, contact information, and the like. The user information may further include whether the users purchase or receive insurance through the establishment (e.g., employer), whether the users have primary insurance and secondary or supplemental insurance, and the like. In some examples, the user information received may include information associated with users who purchase or receive supplemental or secondary insurance. In some arrangements, the user information received may be associated with users who have a relationship with the entity implementing the system (e.g., purchase or receive primary and/or supplemental insurance from the entity, etc.). In still other arrangements, the user information received may be associated with only users having a relationship with the entity implementing the system.

In step 402, primary insurance information may be received. For instance, the primary insurance information received may include names of users (e.g., of a plurality of users associated with the business establishment) who have primary insurance through the primary insurance provider. In some examples, the primary insurance information may include information associated with one or more claims submitted by one or more users. The claim information may include, for example, billing codes associated with various services that may be used, such as by the secondary insurance server, to identify services for which claims were submitted, determine coverage, and the like.

In addition to or in lieu of the billing codes, the primary insurance information may include names or other identifiers of the users, descriptions of medical services received or associated with one or more claims submitted, and the like. In some examples, the primary insurance information may include confidential and non-confidential information. Further, in some arrangements, the system may be configured to obtain permission from one or more users to share information with the entity implementing the system, primary insurance provider, and the like. However, in some examples, information associated with users having a relationship with the entity (e.g., obtaining insurance from the entity) is being transmitted and permission may be granted through that relationship.

In some examples, the primary insurance information may be in the form of a report identifying users and associated services, claims, etc. Further, the primary insurance information may be transmitted directly from a third party, such as the primary insurance provider, to the entity implementing the system or may be transmitted from the third party to the business establishment (e.g., the employer of the users) who may then transmit the information to the entity implementing the system (e.g., the secondary insurance server).

In step 404, a determination is made as to whether a match exists between the received user information and the received primary insurance information. For instance, a determination is made as to whether any of the users for which information has been received, have also received services covered by insurance, submitted a claim, etc. If so, any matching data may be used to identify users with a claim or who have received medical services in step 406. That is, any user information that matches data received in the primary insurance information may be identified as a match and may be flagged for further processing.

As discussed above, in some arrangements, the user information and insurance information may be received from the primary insurance provider. Accordingly, in some examples, steps 400 and 402 may be combined and, thus, the matching step might not be implemented.

If, in step 404, no matches exist or are identified the process may end.

Alternatively, once users having a match (e.g., employees of the business establishment who have received services covered by insurance, have submitted a claim, etc.), or users who have submitted claims in situations in which no matching step occurs, are identified, a determination may be made, in step 408, as to whether those users also have supplemental or secondary insurance coverage. If not, the users may be flagged for further processing in step 410. For instance, the further processing may include analyzing the user, services received, etc. to determine whether they are eligible to receive or purchase supplemental or secondary insurance, determine whether the user has ever declined the supplemental or secondary insurance, etc. In some examples, the users may be notified of their eligibility for supplemental insurance based on being identified as not having the insurance in step 408.

If, in step 408, it is determined the user(s) do have supplemental or secondary insurance, a determination may be made in step 412 as to whether one or more services associated with the user (e.g., services associated with the primary insurance data received in step 402) are covered by the supplemental or secondary insurance. For instance, a determination may be made, based on received information such as billing codes associated with services, whether the services, or a portion thereof, may be covered by the supplemental or secondary insurance. If not, the process may end.

If the services are covered by the supplemental or secondary insurance in step 412, a determination may be made in step 414 as to whether the user has already submitted a claim to the supplemental or secondary insurance provider. If so, no further action is needed or taken and the process may end. If not, a notification may be generated in step 416 indicating, to the user, that one or more services may be covered by their supplemental or secondary insurance. In some examples, the notification may include contact information (e.g., websites, phone numbers, etc.) at which the user can obtain additional information. In some examples, the notification (if electronic) may include a link to a claims submittal web site.

As discussed above, the notification may be electronic or may be hard copy. Accordingly, the notification may be transmitted to the user via electronic means, such as email, SMS, etc. or may be mailed or provided to the user as a paper document.

Figure 5A:

FIGS. 5A and 5B illustrate example notifications that may be transmitted to a user. FIG. 5A includes an electronic notification 500 that provides general information to the user indicating that services may be covered by supplemental or secondary insurance. Notification 500 further includes a link 501 that may be used to directly access a claim processing system the secondary insurance provider. Notification 500 further includes "OK" option 502. In some arrangements, selection of option 502 may redirect or connect a user to additional information associated with the insurance, such as a website of the secondary insurance provider. Notification 500 further includes "CANCEL" option 504. Selection of this option may close the notification and/or return a user to a previous page, message, etc. Notification 500 may be transmitted to a computing device of the user, such as a smart phone, tablet computer, etc. via known methods of transmission, such as email, SMS, and the like.

Notification 520 in FIG. 5B may be a hard copy document of a notification to the user. Similar to notification 500, notification 520 may provide general information to the user indicating that services may be covered by supplemental or secondary insurance. The notification 520 includes contact information, such as a phone number and/or web address, which the user may contact to obtain additional information. In some examples, the notification may be transmitted on letterhead or with another indication that it is being sent from the supplemental or secondary insurance provider.

In the arrangements described above, user information, insurance information, portions thereof, etc., may be deleted at one or more points of the process in order to reduce the risk of exposure of a user's confidential information. For instance, upon receiving user and/or insurance information, if it is determined that a user for which insurance information (e.g., a claim) has been received does not have supplemental insurance, that user's information may be removed or deleted from the system. Reducing the amount of user information stored by the system may reduce the risk of any confidential information being compromised in the event of a security breach, may reduce the amount of data storage required, etc.

The above example is merely one example of a user's information being deleted. Information may be deleted or removed at various other points in the process without departing from the invention. For instance, upon determining that a user for which user information and insurance information (e.g., a claim) have been received has supplemental insurance and has already submitted a claim, the information received associated with that user may be removed or deleted. Again, various other examples of deleting or removing user information, or a the point in the process at which the information is deleted or removed, may be used without departing from the invention.

Although the systems, methods, etc. described herein are generally described in the context of medical insurance, the systems, methods, etc. may be used with various other types of insurance. For instance, a user may have primary life insurance as well as supplemental life insurance. In other examples, a user may have primary automotive insurance as well as supplemental auto insurance. Various aspects of the systems, methods, etc. described herein may be used with various types of insurance without departing from the invention.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the invention.

What is claimed is:

1. A computer, comprising:
   at least one processor;
   a communication interface; and
   a memory unit storing computer-executable instructions, which when executed by the at least one processor, cause the computer to:
   receive, via the communication interface, insurance claim-information filed for a first plurality of users having coverage under a primary insurance provided by a first insurance provider, the insurance claim information including a name of each user of the first plurality of users and information identifying a claim of the primary insurance of each of the first plurality of users;

compare a listing of insurance claim information for the first plurality of users to a listing of users having secondary insurance;

based on the comparing, identify a second plurality of users, each user of the second plurality of users having a claim of the primary insurance and having secondary insurance provided by a second insurance provider different from the first insurance provider;

for a first user of the second plurality of users, the first user having a first claim of the primary insurance for a first service, and prior to or without a claim for the first service being submitted to the secondary insurance:

determine, based on the received insurance claim information associated with the first claim of the primary insurance for the first service, whether the first service of the first user is eligible for coverage under the secondary insurance of the first user;

responsive to determining that the first service of the first user is eligible for coverage under the secondary insurance, generate and transmit, via a wireless telecommunications network, an electronic notification to a device of the first user indicating the eligibility of the first service for coverage by generating a notification message and embedding an electronic link to a network location within the notification message, the electronic link configured to direct the device of the first user to the network location; and responsive to determining that the first service of the first user is not eligible for coverage under the secondary insurance, deleting the received information for insurance claims associated with the first user.

2. The computer of claim 1, further including displaying the electronic notification on the device of the first user.

3. The computer of claim 1, wherein transmitting the electronic notification to the first user further includes transmitting a hard copy of the electronic notification to the first user.

4. The computer of claim 1, wherein the second plurality of users is a subset of the first plurality of users.

5. The computer of claim 1, wherein the information identifying a claim of the primary insurance of each of the first plurality of users includes a billing code associated with services for each user for which a claim has been submitted to the first insurance provider.

6. The computer of claim 1, wherein determining whether the first service of the first user is eligible for coverage under the secondary insurance of the first user includes determining that the primary insurance did not provide full coverage of a cost of the first service and determining whether a remainder of the cost of the first service not covered by the primary insurance is covered by the secondary insurance.

7. The computer of claim 1, further including instructions that, when executed, cause the computer to:

responsive to determining that the first service of the first user is eligible for coverage under the secondary insurance, determine whether the first user submitted a claim to the second insurance provider for the first service; and responsive to determining that the first user did not submit a claim to the second insurance provider, generate the electronic notification to the first user indicating the eligibility for coverage.

8. A method, comprising:

receiving, via a communication interface and by an insurance claim coverage system having at least one processor, insurance claim information filed for a first plurality of users having coverage under a primary insurance, the insurance claim information including a name of each user of the first plurality of users and information identifying a claim of the primary insurance of each of the first plurality of users;

comparing, by the insurance claim coverage system, a listing of insurance claim information for the plurality of users to a listing of users having secondary insurance;

based on the comparing, identifying, by the insurance claim coverage system, a second plurality of users, each user of the second plurality of users having a claim of the primary insurance and having secondary insurance;

for a first user of the second plurality of users, the first user having a first use of the primary insurance for a first service, and prior to or without a claim being submitted for the first service to the secondary insurance:

determining, by the insurance claim coverage system and based on the received insurance claim information associated with the first use of the primary insurance for the first service, whether the first service of the first user is eligible for coverage under the secondary insurance of the first user;

when it is determined that the first service of the first user is eligible for coverage under the secondary insurance, generating and transmitting, by the insurance claim coverage system and via a wireless communications network, an electronic notification to a device of the first user indicating the eligibility of the first service for coverage by generating a notification message and embedding an electronic link to a network location within the notification message, the electronic link configured to direct the device of the first user to the network location; and when it is determined that the first service of the first user is not eligible for coverage under the secondary insurance, deleting the received insurance claim information associated with the first user.

9. The method of claim 8, further including displaying the electronic notification on the device of the first user.

10. The method of claim 9, wherein transmitting the electronic notification to the first user further includes transmitting a hard copy of the electronic notification to the user.

11. The method of claim 10, wherein the device of the first user is a mobile device.

12. The method of claim 8, wherein the second plurality of users is a subset of the first plurality of users.

13. The method of claim 8, wherein the information associated with a use of a primary insurance of each of the first plurality of users includes a billing code associated with services for each user for which a claim has been submitted to a provider of the primary insurance.

14. The method of claim 8, wherein determining whether the first service of the first user is eligible for coverage under the secondary insurance of the first user includes determining that the primary insurance did not provide full coverage of a cost of the first use of the primary insurance and determining whether a remainder of the cost of the first use not covered by the primary insurance is covered by the secondary insurance.

15. The method of claim 8, further including:
responsive to determining that the first service of the first user is eligible for coverage under the secondary insurance, determining, by the insurance claim coverage system, whether the first user submitted a claim to a provider of the secondary insurance for the first service; and
responsive to determining that the first user did not submit a claim to the provider of the secondary insurance, generating, by the insurance claim coverage system, the notification to the first user indicating the eligibility for coverage.

16. A system, comprising:
at least one processor;
a communication interface; and
memory operatively coupled to the at least one processor, the memory storing computer-executable instructions that, when executed, cause at least one apparatus to:
receive, via the communication interface and from a computing device of a business establishment, a listing of a plurality of employees of the business establishment, the plurality of employees having coverage under a primary insurance;
receive, from a computing device of a provider of the primary insurance, a listing of claims for the primary insurance submitted by at least a portion of the plurality of employees, the listing of claims including at least a name of each employee of the plurality of employees and a billing code associated with each service for which each claim was submitted;
match the received listing of a plurality of employees with the received listing of claims to identify a subset of the plurality of employees who are employees and have submitted claims to the primary insurance provider;
determine whether each employee in the subset of the plurality of employees holds secondary insurance;
responsive to determining that a first employee in the subset, who submitted a claim for the primary insurance for a service, holds secondary insurance, and prior to or without the first employee submitting a claim for the service to the secondary insurance, determine whether the service for which the first employee submitted a claim is eligible for coverage under the secondary insurance;
responsive to determining that the service for which the first employee submitted the claim is eligible for coverage under the secondary insurance, determine whether the first employee submitted a claim for the service to a provider of the secondary insurance;
responsive to determining that the first employee did not submit a claim for the service to the provider of the secondary insurance, generate and transmit, via a wireless telecommunications network, an electronic notification to a device of the first employee indicating eligibility of the service for coverage by generating a notification message and embedding an electronic link to a network location within the notification message, the electronic link configured to direct the device of the first employee to the network location; and
responsive to determining that the service for which the first employee submitted the claim is not eligible for coverage under the secondary insurance, delete data received with the listing of the plurality of employees associated with the first employee.

17. The system of claim 16, further including displaying the electronic notification on the device of the first employee.

18. The system of claim 17, wherein transmitting the electronic notification to the first employee further includes transmitting a hard copy of the electronic notification to the first employee.

19. The system of claim 18, wherein the device of the first employee is a mobile device.

20. The computer of claim 1, wherein prior to receiving, via the communication interface, information for insurance claims filed for a first plurality of users having coverage under a primary insurance provided by a first insurance provider, determining that permission to receive the information is granted based on a predefined relationship between the first plurality of users and the first insurance provider.

* * * * *